United States Patent
Shan et al.

(10) Patent No.: US 8,219,721 B2
(45) Date of Patent: *Jul. 10, 2012

(54) MOBILE TERMINAL AND SWITCHING METHOD FOR CONTROLLING DATA TRANSMISSION VIA HIGH SPEED OR LOW SPEED INTERFACES BASED ON PRESET THRESHOLD

(75) Inventors: Wenying Shan, Beijing (CN); Xiaobing Huang, Beijing (CN); Yonggui Zhao, Beijing (CN); Shaoyuan Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/238,854

(22) Filed: Sep. 21, 2011

(65) Prior Publication Data

US 2012/0009883 A1    Jan. 12, 2012

Related U.S. Application Data (62) Division of application No. 12/637,670, filed on Dec. 14, 2009, now Pat. No. 8,055,810.

(30) Foreign Application Priority Data

Dec. 16, 2008  (CN) .......................... 2008 1 0239956

(51) Int. Cl.
*G06F 3/00* (2006.01)
(52) U.S. Cl. ................ 710/18; 710/15; 710/16; 710/17; 710/19; 713/300; 713/320; 709/222; 709/233; 370/229

(58) Field of Classification Search .............. 710/15–19; 713/300, 320; 709/222, 233; 370/229
See application file for complete search history.

(56) References Cited

U.S. PATENT DOCUMENTS

| | | | | |
|---|---|---|---|---|
| 6,791,942 B2* | 9/2004 | Jin | ................ | 370/229 |
| 7,236,461 B1* | 6/2007 | Sonti et al. | .................... | 370/252 |
| 7,263,555 B2* | 8/2007 | Banerjee et al. | .............. | 709/226 |
| 7,574,619 B2* | 8/2009 | Senda | ........... | 713/322 |
| 7,974,189 B2* | 7/2011 | Bomhoff et al. | .............. | 370/229 |
| 2006/0037075 A1* | 2/2006 | Frattura et al. | .................. | 726/22 |
| 2006/0182128 A1* | 8/2006 | Nakata et al. | ................. | 370/401 |
| 2008/0144661 A1* | 6/2008 | Ali | .............. | 370/468 |
| 2010/0131781 A1* | 5/2010 | Memon et al. | ............... | 713/310 |

* cited by examiner

*Primary Examiner* — Tammara Peyton
(74) *Attorney, Agent, or Firm* — Kinney & Lange, P.A.

(57) ABSTRACT

A mobile terminal and switching method for controlling data transmission interface thereof are provided. The mobile terminal includes an application processor, a communication processor and data transmission interfaces thereof, the application processor including a traffic monitor unit and an interface control unit, wherein the traffic monitor unit is configured to detect data traffic of data transmission, compare the data traffic with a preset threshold to obtain a comparison result, and output the comparison result; and the interface control unit is configured to control, on receipt of the comparison result, the connection or disconnection of a high-speed data line between the application processor and the communication processor, and to transmit a corresponding interface switching command to the communication processor for switching the data transmission interface. With the present system, the power consumption of the system can be reduced and the efficiency of the data transmission can be improved.

4 Claims, 4 Drawing Sheets

MOBILE TERMINAL AND SWITCHING METHOD FOR CONTROLLING DATA TRANSMISSION VIA HIGH SPEED OR LOW SPEED INTERFACES BASED ON PRESET THRESHOLD

CROSS-REFERENCE TO RELATED APPLICATION(S)

This application is a division of U.S. application Ser. No. 12/637,670 filed on Dec. 14, 2009 for "Mobile Terminal and Switching Method for Controlling Data Transmission Interface Thereof" by Wenying Shan, Xiaobing Huang, Yonggui Zhao and Shaoyuan Wang, which claims priority to Chinese Application No. 200810239956.1 filed on Dec. 16, 2008. U.S. application Ser. No. 12/637,670 is hereby incorporated by reference herein in its entirety.

FIELD OF THE INVENTION

The present invention relates to mobile terminal technology and, more particularly, to a mobile terminal and switching method for controlling data transmission interfaces thereof.

BACKGROUND OF THE INVENTION

A smart phone typically employs an architecture composed of an application processor and a communication processor, where the communication processor serves as a peripheral of the application processor and connected thereto via a fixed interface.

Currently, there are generally the following two types of interfaces for connecting the application processor with the communication processor.

Specifically, on one hand, a Universal Asynchronous Receiver/Transmitter (UART) interface can be used to connect the application processor (AP) with the communication processor (CP). A modem interface instruction set (AT command) can be used for communication. Power management can be implemented between the AP and the CP by a handshake protocol. In a sleep state, the power consumption of the UART interface is approximately 5 uA, while in a communication state, the power consumption can be lower than 5 mA due to simplicity of the UART interface protocol. Meanwhile, as the UART interface is an internal connection interface of a chip, its level can be typically set as a digital IO voltage 2.8V or even 1.8V. Thus, the power consumption of the UART interface communication is quite low. That is, for UART, the power consumption can be 5 uA*1.8V=0.01 mW in the sleep state and 5 mA*1.8V=9 mW in a data transmission mode. However, the maximum rate for the UART interface communication is only 3 Mbps, which can only satisfy the requirements of the second generation Mobile network communication systems and fails to satisfy the increasingly high rate of the third or fourth generation Mobile network communication systems.

On the other hand, a USB interface can be used to connect the AP with the CP. The full rate of a USB interface can be up to 12 Mbps, while the high-speed USB, such as USB 2.0, can be up to 480 Mbps, which can satisfy the requirements of the subsequent third generation HSPA or fourth generation mobile communication systems. This can be implemented by multiplexing USB interfaces into a UART interface which uses the AT command for communication between the AP and the CP. Since the maximum rate of the USB interface can be as high as 480 Mbps, the requirements of the subsequent third/fourth generation communications can be fully satisfied. However, the high rate comes at the expense of high power consumption. In addition, the power management between the AP and the CP is conducted using a remote wakeup function of the USB protocol. When there is no data exchange, the USB is suspended and its interface power consumption is higher than 1 mA. When there is data transmission between the AP and the CP, the power consumption of the USB interface is higher than 60 mA. The power consumption of the USB interface is relatively high due to its high voltage. Specifically, the power consumption of the USB interface is 1 mA*3.3V=3.3 mW in a suspended mode and 60 mA*3.3V=200 mW in a data transmission mode.

Although the high-speed USB can satisfy the requirements of the subsequent third or fourth generation mobile communication systems without being a bottleneck of wireless communication, the high power consumption of the USB can be problematic since the AP, serving as the USB host, is always connected to the CP. However, high-speed transmission is not always required during actual communication, where applications are mostly voice calls, video calls and other low-speed data transmissions. Further, as the AP of a mobile terminal serves as a USB HOST during communication with CP, if the AP additionally serves as a USB OTG interface for the mobile terminal, the mobile terminal cannot function as a USB CLIENT device during communication.

In research and practice of the prior art, the following discoveries are made by the inventor. Currently, by using a UART interface to connect the AP with the CP, only the requirements of the second and third generation communications can be satisfied. On the other hand, by using a high-speed USB interface to connect the AP with the CP, the requirements of the third or fourth generation communications can be satisfied. However, the power consumption increases with the increase of the rate and the USB complicated protocol. That is, the tradeoff between the rate and the power consumption cannot be obtained by any interface of prior art which connects the AP with the CP. In other words, the data transmission interfaces cannot be switched adaptively according to the data traffic of the data transmission.

SUMMARY OF THE INVENTION

According to the embodiments of the present invention, a mobile terminal and switching method for controlling a data transmission interface thereof is provided. As such, a low-speed interface is used to connect for communication during a standby, a voice call and a low-speed transmission. During data communication, the data traffic is detected and the data transmission interface is automatically switched to a high-speed or low-speed interface according to the transmitted data traffic, thereby dramatically reducing the power consumption of the mobile terminal in the standby, voice call and low-speed states and thus improving the efficiency of data transmission.

To solve the above technical problem, according to an embodiment of the present invention, a mobile terminal is provided, which comprises an application processor, a communication processor and data transmission interfaces thereof, the application processor comprising a traffic monitor unit and an interface control unit, wherein the traffic monitor unit is configured to detect data traffic of data transmission, compare the data traffic with a preset threshold to obtain a comparison result, and output the comparison result; and the interface control unit is configured to control, on receipt of the comparison result, the connection or disconnection of a high-speed data line between the application processor and the communication processor, and to transmit a corresponding interface switching command to the communication processor for switching the data transmission interface of the communication processor.

Correspondingly, according to an embodiment of the present invention, a switching method for controlling data transmission interfaces of a mobile terminal is provided, which comprises the following steps of:

detecting data traffic at a data transmission interface of an application processor;

comparing the data traffic with a preset threshold to obtain a comparison result;

controlling a high-speed data line between the application processor and a communication processor based on the comparison result; and transmitting a corresponding interface switching command to the communication processor for switching the data transmission interface of the communication processor.

According to the present invention, the data traffic of data transmission is detected, the detected data traffic is compared with a preset threshold, and the connection or disconnection of the high-speed data line between the application processor and the communication processor is controlled based on the comparison. Meanwhile, an interface switching command for switching the data transmission interface to a high-speed interface or a low-speed interface is transmitted to the communication processor, and the data transmission interface of the application processor is switched to the high-speed interface or the low-speed interface on receipt of a response fed back from the communication processor indicating a successful interface switching. In other words, the high-speed data line is disconnected in a normal state where the application processor uses the low-speed interface to perform the transmission of signaling, data and switch commands with the communication processor, thereby reducing the power consumption of the mobile terminal during a standby and a low-speed communication process. When the mobile terminal requires a high-speed data service, a switch device is controlled to connect the high-speed data line (such as a data line D+/D−) between the application processor and the communication processor. That is, the application processor serves as a master device and the communication processor serves as a slave device. In this case, the communication is conducted according to fixed device configuration information, that is, the bus configuration process for the USB is omitted and the application processor, which is the master device, communicates with the communication processor by using a fixed address and a fixed device identifier.

Therefore, according to the embodiments of the present invention, an adaptive switching of the data transmission interface can be achieved while obtaining the tradeoff between the rate and the power consumption of the data transmission interface for the application processor and the communication processor, such that the efficiency of data transmission can be improved.

DETAILED DESCRIPTION OF THE PREFERRED EMBODIMENTS

The preferred embodiments of the present invention will be detailed in the following with reference to the drawings.

The embodiments of the present invention generally consider the advantages of the prior art and eliminate the defects of the prior art. As such, the CP is connected in hardware to a low-speed interface (such as a UART interface) of the AP and to a high-speed data line (such as a data line D+/D− on a USB OTG interface) for a high-speed interface (such as a USB interface, or a USB OTG interface as an example of a high-speed interface) of the AP via a switch device. Herein, the data line D+/D− carries a pair of differential signals for transmitting USB communication data. Further, the UART interface and the USB interface can be considered in software as two interfaces for communication, i.e., the high-speed interface and the low-speed interface, which can be denoted by socket-UART and socket-USB, respectively. In a normal state, only the socket-UART of the AP is connected to the CP, with the connection for the socket-USB disconnected for reducing the power consumption of the system.

In the normal state, the socket-UART provides data, signaling interactions and transmission channels for switching data. In such state, voice calls and low-speed data services can be provided. However, when the system requires a high-speed data service, a switch device is controlled to connect the AP's data line D+/D− of the USB OTG interface with the CP's. That is, the AP serves as a master device and the CP serves as a slave device. In this case, the communication is conducted according to fixed device configuration information, that is, the bus configuration process for the high-speed interface (such as the USB interface) is omitted and the AP, which is the master device, communicates with the CP by using a fixed address and a fixed device identifier. The system enables the socket-USB, uses the socket-UART as a control and switch channel and the socket-USB as a data channel. That is, two channels are utilized to achieve a high-speed data transmission. When the data traffic decreases, the system disables the socket-USB and disconnects the data line D+/D− of the USB OTG interface, such that the power consumption of the system can be reduced.

According to an embodiment of the present invention, a mobile terminal is provided, which comprises an application processor, a communication processor and data transmission interfaces thereof. The application processor comprises a traffic monitor unit and an interface control unit. The traffic monitor unit is configured to detect data traffic of data transmission, compare the data traffic with a preset threshold to obtain a comparison result, and output the comparison result. The interface control unit 114 is configured to control, on receipt of the comparison result, the connection or disconnection of a high-speed data line between the application processor and the communication processor, and to transmit a corresponding interface switching command to the communication processor for switching the data transmission interface.

To facilitate the understanding of those skilled in the art, references are made to the particular embodiments in the following, where the preset threshold comprises, by way of a non-limiting example, a first preset threshold and a second preset threshold.

Figure 1:
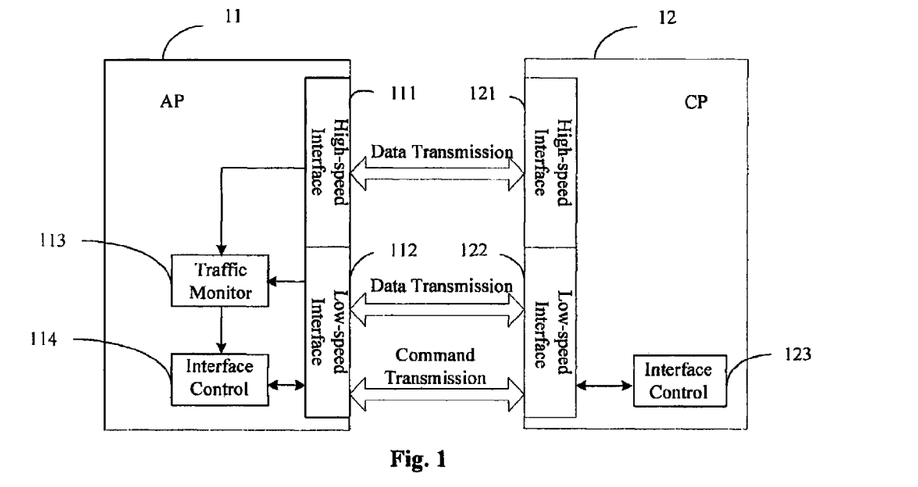
FIG. 1 is a structural diagram of the mobile terminal according to the first embodiment of the present invention.

Reference is now made to FIG. 1, which is a structural diagram of the mobile terminal according to the first embodiment of the present invention. The mobile terminal comprises an application processor 11, a communication processor 12 and data transmission interfaces of the application processor 11 and of the communication processor 12. The application processor 11 comprises a traffic monitor unit 113 and an interface control unit 114. The communication processor 12 comprises an interface control unit 123. Herein, the data transmission interface of the application processor comprises for example a high-speed interface 111 and a low-speed interface 112, and the data transmission interface of the communication processor comprises for example a high-speed interface 121 and a low-speed interface 122.

The traffic monitor unit 113 is configured to detect data traffic of data transmission, calculate an average data traffic (as a non-limiting example) transmitted within a predetermined period, compare the average data traffic with a first preset threshold and a second preset threshold, respectively, and transmit to the interface control unit a notification indicating the data traffic is higher than the first preset threshold or lower than the second preset threshold based on the comparison, i.e., to transmit a notification indicating the data traffic as being high or low.

The interface control unit 114 is configured to control, in response to the receipt of the notification indicating the data traffic as being high or low, the connection or disconnection of the high-speed data line between the application processor and the communication processor, transmit a corresponding interface switching command (e.g., instructing to transmit via the low-speed interface) to the communication processor, and switch the data transmission interface in response to the receipt of a message fed back from the communication processor indicating a successful interface switching.

The interface control unit 123 of the communication processor 12 is configured to switch the communication processor from the low-speed interface to the high-speed interface, or vice versa, in response to the receipt of the interface switching command transmitted from the interface control unit 114 of the application processor 11, and to feed back a confirm message to the interface control unit of the application processor indicating a successful interface switching.

It is to be noted that, in the normal state, the power management between the application processor (AP) and the communication processor (CP) is achieved using RTS/CTS and the like at the low-speed interface for switching between the standby state and the communication state. Low speed connection between the low-speed interfaces of the AP and the CP is always on for signaling interaction. In a voice call state, the high-speed data line between the AP and the CP is disconnected. In this case, the communication and the signaling interaction between the AP and the CP are performed using RX/TX at the low-speed interface by means of the AT command set, so that the voice call can be achieved. In a low-speed data communication state, the high-speed data line between the AP and the CP remains disconnected. In this case, the AP and the CP are connected to each other via the low-speed interfaces, and the signaling interaction and the low-speed data service communication are performed using AT command set. At this time, the traffic monitor unit 113 is started to detect the data traffic at the low-speed interface.

In other words, when the mobile terminal is powered on, the information interaction between the AP and the CP is initially conducted via the low-speed interfaces, with the high-speed data line between them being disconnected. When there is low-speed data to be transmitted, the interaction by means of the AT command set and the low-speed data service are conducted via the low-speed interface again. Only at this time the traffic monitor unit 113 is started to detect the data traffic at the low-speed interface. If the detected data traffic is lager than a certain threshold (e.g., a first preset threshold), a notification indicating the data traffic as being high is transmitted to the interface control unit 114. For example, the traffic monitor unit 113 calculates an average data traffic over a 5-second period and transmits a signal indicating the data traffic as being high to the interface control unit 114 if the calculated average data traffic is higher than 2 Mbps. The interface control unit 114 controls, on receipt of the notification indicating the data traffic as being high, to connect the high-speed data line between the AP and the CP, and transmits to the CP an interface switching command instructing the CP to switch the data transmission interface of the CP to the high-speed interface, and switches the data transmission interface of itself from the low-speed interface to the high-speed interface on receipt of the message fed back from the CP indicating a successful interface switching. Low speed connection between the low-speed interfaces of the AP and the CP is still on for signaling interaction.

Accordingly, when the traffic monitor unit 113 detects that the data traffic at the high-speed interface is lower than a certain threshold (e.g., a second preset threshold), a notification indicating the data traffic as being low is transmitted to the interface control unit 114. For example, the traffic monitor unit 113 calculates an average data traffic over 5 seconds and transmits a signal indicating the data traffic as being low to the interface control unit 114 if the calculated average data traffic is lower than 1.5 Mbps. The interface control unit 114 controls, in response to receipt of the notification, to disconnect the high-speed data line between the AP and the CP, transmits to the CP an interface switching command instructing the CP to switch the data transmission interface of the CP to the low-speed interface, and switches the data transmission interface of itself from the high-speed interface to the low-speed interface on receipt of the message fed back from the CP indicating a successful interface switching.

In particular, the traffic monitor unit 113 comprises a detection unit, a calculation unit and a determination unit. The detection unit is configured to detect the data traffic at the low-speed or high-speed interface. The calculation unit is configured to calculate an average data traffic transmitted within a predetermined period as detected by the detection unit. The determination unit is configured to determine whether the average data traffic as calculated by the calculation unit is higher than a first preset threshold or a second preset threshold, and to transmit to the interface control unit a notification indicating the data traffic as being high if the average data traffic is higher than the first preset threshold or a notification indicating the data traffic as being low if the average data traffic is lower than the second preset threshold.

The AP 11 further comprises a general purpose input output (GPIO) interface. The high-speed interface of the AP 11 may include a USB interface, a high-speed USB interface or a USB On-The-Go (USB OTG) interface. The high-speed interface of the CP 12 may include a USB interface, a high-speed USB interface or a USB OTG interface. Of course, in this embodiment only interfaces relevant to the present invention are mentioned while the description for other interfaces on the AP is omitted.

In particular, the interface control unit 114 of the AP comprises an initial setting unit, a switch control unit, a switching command transmission unit, a switching command receiving unit and an interface switching unit. The initial setting unit is configured to control, via the GPIO interface, a switch device to disconnect the high-speed data line between the USB OTG interfaces of the AP and the CP when the mobile terminal is powered on, and to start the traffic monitor unit to monitor the data traffic in real time when a data service starts. The switch control unit is configured to control, via the GPIO interface, a switch device to connect the high-speed data line between the USB OTG interfaces of the AP and the CP on receipt of the notification transmitted from the determination unit indicating the data traffic as being high, or control, via the GPIO interface, a switch device to disconnect the high-speed data line between the USB OTG interfaces of the AP and the CP on receipt of the notification indicating the data traffic as being low. The switching command transmission unit is configured to transmit, via the low-speed interface, to the CP connected with the AP an interface switching command instructing to switch the data transmission interface to the high-speed interface after the switch control unit controls the switch device to connect the high-speed data line at the USB OTG interfaces, or to transmit, via the low-speed interface, to the CP connected with the AP an interface switching command instructing to switch the data transmission interface to the low-speed interface after the switch control unit controls the switch device to disconnect the high-speed data line at the USB OTG interfaces. The switching command receiving unit is configured to transmit to the interface switching unit a notification indicating a successful interface switching on receipt of a message fed back from the CP connected with the AP indicating a successful interface switching. The interface switching unit is configured to switch, on receipt of the notification transmitted from the switching command receiving unit indicating the successful interface switching, the data transmission interface of the AP from the low-speed interface to the high-speed interface, or vice versa.

In particular, the interface control unit of the CP comprises an initial setting unit, a switching command receiving unit, an interface switching unit and a switching command transmission unit. The initial setting unit is configured to set a low-speed channel for signaling interaction and data transmission when the mobile terminal is powered on. The switching command receiving unit is configured to receive via the low-speed interface an interface switching command transmitted from the AP. The interface switching unit is configured to switch, on receipt of the interface switching command by the switching command receiving unit, the data transmission interface of the CP from the low-speed interface to the high-speed interface, or vice versa. The switching command transmission unit is configured to transmit via the low-speed interface a command to the AP indicating the successful interface switching when the interface switching unit successfully completes the interface switching.

Herein, the low-speed interface of this embodiment may include a UART interface, and the high-speed interface may include a USB interface, a high-speed USB interface or a USB OTG interface. The high-speed data line at the high-speed interface may include a data line D+/D−.

Figure 2:
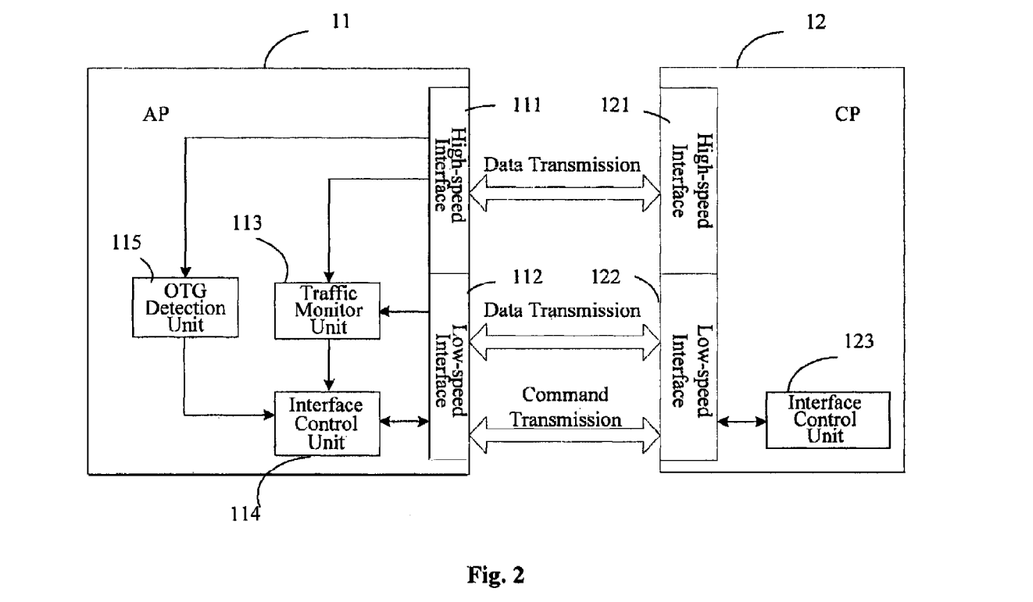
FIG. 2 is a structural diagram of the mobile terminal according to the second embodiment of the present invention.

Reference is now made to FIG. 2, which is a structural diagram of the mobile terminal according to the second embodiment of the present invention. In this embodiment, the mobile terminal comprises an AP 11 and a CP 12. The AP 11 further comprises an OTG detection unit 115 in addition to the units and interfaces as described above with regard to the first embodiment. The description of the functions of the respective units and interfaces of the AP 11 and the CP 12 which are common between the first and second embodiments has already been detailed with respect to the above first embodiment and is thus omitted here. The OTG detection unit 115 is configured to detect whether there is an external USB OTG device inserted into the AP and to set, upon such detection, the AP as a master or slave device after negotiating with the inserted USB device. The OTG detection unit 115 is further configured to notify the interface control unit 114 to switch the corresponding data transmission interface if the AP is set as the slave device.

In particular, the OTG detection unit 115 comprises a detection unit, a negotiation unit and a setting unit. The detection unit is configured to detect whether there is an external USB OTG device inserted during high-speed data communication, and transmit a detection result for USB OTG interface insertion. The negotiation unit is configured to negotiate, on receipt of the detection result indicating the insertion of a USB OTG device, with the external USB OTG device and transmit a negotiation result. The setting unit is configured to set the AP as the master or slave device based on the received negotiation result. If the AP is set as the master device, it will communicate with the external USB OTG device and the CP as the slave devices simultaneously. If the AP is set as the slave device, it will switch the data transmission interface to the low-speed interface, transmit an interface switching command to the interface control unit instructing the latter to disconnect the high-speed data line between the AP and the CP, communicate as the slave device with the external USB OTG device and maintain its data communication with the CP at the same time.

If the inserted USB OTG device is a master device, the mobile terminal will be set as a slave device. In such a case, the USB data connection between the AP and the CP is disconnected and the data service is automatically switched to the socket-UART, such that the mobile terminal can become a USB slave device. If the inserted device is a slave device, the AP will perform communication as a master device with its two slave devices (i.e., the CP and the external USB OTG slave device) according to the USB protocol.

In other words, comparing with the first embodiment, this embodiment further solves the problem of implementing, by the AP of the mobile terminal, both the function of high-speed communication with the CP and the function of USB OTG of the mobile terminal using a single USB OTG interface. That is, in the normal state (such as standby, voice call and low-speed data communications), the USB OTG of the AP is disconnected with the CP and the mobile terminal uses this interface as its USB OTG interface. In the high-speed data communication state, the mobile terminal (e.g., a handset) still serves as a USB device which detects whether there is another USB device inserted by using the bus voltage signal (VBUS) and the identification (ID) pin of the USB. If it is detected using the VBUS and the ID pin that there is another device inserted, and it is determined by negotiation that the inserted USB OTG device serves as a master device, then the mobile terminal will become a slave device. In this case, the mobile terminal disconnects the data line D+/D− between the AP and the CP, and switches the data service to the socket-UART automatically. Afterwards, the mobile terminal becomes the slave device of the inserted USB OTG device and at the same time maintains data communication with the CP. If the inserted USB OTG device is determined as a slave device, the mobile terminal will perform high-speed communication between AP, which is a master device, and its two slave devices (i.e., the CP and the inserted USB OTG device) according to the USB protocol.

Figure 3:
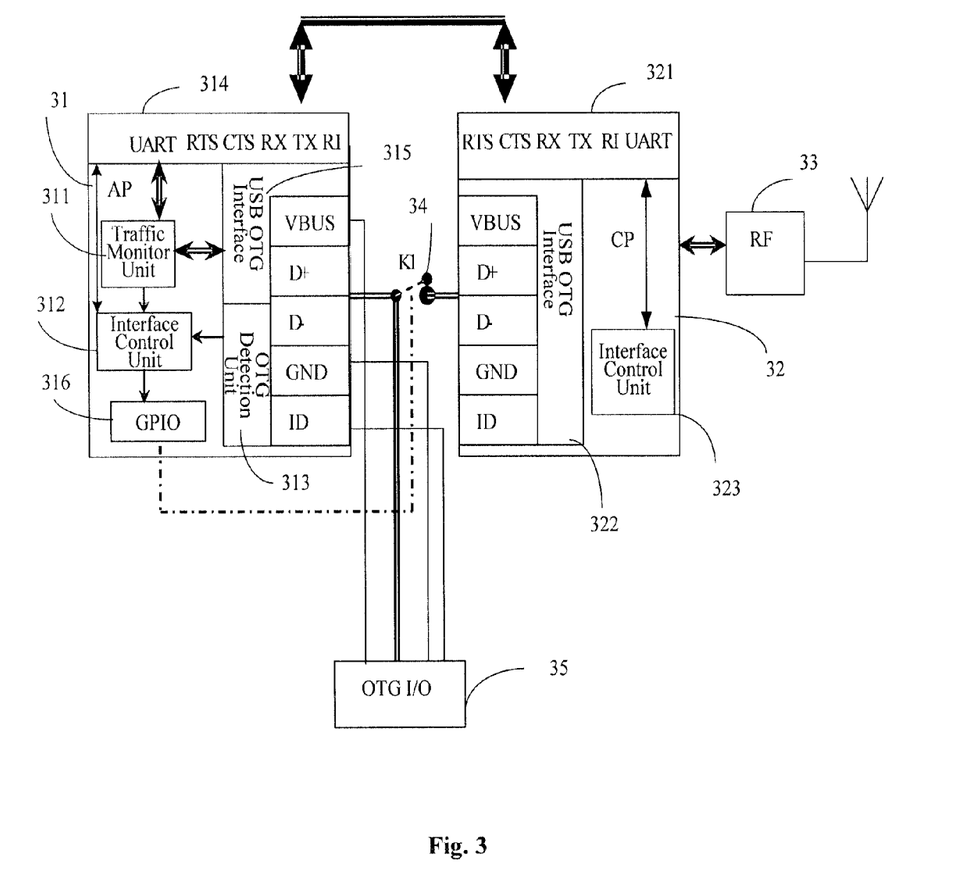
FIG. 3 is a schematic diagram of an application example of the mobile terminal according to the third embodiment of the present invention.

Reference is now made to FIG. 3, which is a schematic diagram of an application example of the mobile terminal according to the third embodiment of the present invention.

As shown, the mobile terminal comprises an AP 31, a CP 32, a radio frequency unit RF33 connected to the CP 32 and its antenna, and a USB interface 35 (i.e., a OTG IO interface) and a switch device 34 (K1) for the mobile terminal. The AP 31 comprises a traffic monitor unit 311, an interface control unit 312, an OTG detection unit 313, a low-speed interface 314 (e.g., a UART interface), a high-speed interface 315 (e.g., a USB OTG interface) and a GPIO interface 316. The CP 32 comprises a low-speed interface 321 (e.g., a UART interface), a high-speed interface 322 (e.g., a USB OTG interface) and an interface control unit 323 which is controlled under the low-speed interface 321.

The switch device 34 (denoted by K1 in FIG. 3) is configured to connect or disconnect the data line D+/D− at the USB OTG interfaces between the AP 31 and the CP 32. The switch device is controlled by the interface control unit 312.

The USB OTG IO interface 35, which is the USB interface for the mobile terminal, is connected to the individual pins of the USB OTG interface of the AP, respectively, and serves as the interface for connecting with an external USB master or slave device.

The description of the functions of the traffic monitor unit 311, the interface control unit 312 and the OTG detection unit 313 has been detailed as above and is thus omitted here.

During the communication between the AP 31 and the CP 32, the respective pins at the UART interface of the AP 31 particularly include: a RTS (Request To Send) for sending request information to the CP, a CTS (Clear To Send) for accepting acceptance information sent from the CP, a RX (Receive) for receiving information sent from the CP, a TX (Transmit) for transmitting information to the CP.

In such case, the functions of the respective pins at the UART interface of the CP 32 exactly corresponds to the functions of the respective pins at the UART interface of the AP 31, particularly including: a RTS (Request To Send) for receiving the request information sent from the AP, a CTS (Clear To Send) for transmitting acceptance information to the AP, a RX (Receive) for receiving information from the AP, a TX (Transmit) for transmitting information to the AP.

The functions of the respective pins as described above constitute a process of communication between the AP 31 and the CP 32. The functions of the respective pins can be implemented otherwise. For example, the RTS pin at the UART interface of the CP 32 can also be used for sending request information to the AP. The functions of other pins can be set in a similar way and their description can thus be omitted here.

The respective pins at the USB OTG interface include: a VBUS for supplying the USB device with a 5V power and an insertion detection signal, a data+/data−(D+/D−), which is a pair of differential signals, for transmitting data for USB communication, an identification (ID) for determining identities of two communication correspondents prior to communication, and a ground (GND). The device controlling the communication between the two correspondents is the slave device when the ID is high, or the master device when the ID is low. By software control, the roles of the master and slave devices can be interchanged according to the Host Negotiation Protocol (HNP).

The GPIO interface 316, which is set as the output interface in the programming design of this embodiment, is configured to provide a switch control signal for controlling the connection and disconnection of the data line D+/D− at the USB OTG interface 317. The high-speed interface of this embodiment is, by way of a non-limiting example, a USB OTG interface.

The implementation process of this embodiment is mainly as follows.

In the normal state where the AP and the CP are both in the standby mode, the connection of the USB OTG interfaces between the AP and the CP is disconnected with only the UART interfaces connected. In this case, the power consumption is quite low, which satisfies the requirements of the standby mode. The power management between the AP and the CP is achieved using RTS/CTS at the UART interface for switching between the standby state and the communication state. In a voice call state, the data line D+/D− at the USB OTG interfaces between the AP and the CP is disconnected. In this case, the communication and the signaling interaction between the AP and the CP are performed using RX/TX at the UART interface by means of the AT command set, such that the voice call can be achieved.

In a low-speed data communication state, the data line D+/D− between the AP and the CP remains disconnected. In this case, the AP and the CP are connected to each other via the UART interfaces, and the signaling interaction and the low-speed data service communication are performed using the AT command set. At this time, the traffic monitor unit is started to detect the data traffic at the UART interface. When the traffic is higher than a first preset threshold, a signal is transmitted to the interface control unit. On receipt of the signal, the interface control unit controls the GPIO interface to output a control signal to the switch device K1 which then connects the data line D+/D−. As such, the AP serves as a USB master device and the CP serves as a USB slave device. In this case, the communication is conducted according to fixed device configuration, that is, the bus configuration process for the USB interface is omitted and the CP communicates with the AP, which is the master device, according to a fixed address and a fixed device identifier. Then, the system enables the socket-USB interface, switches the data communication channel from the UART interface to the USB interface, uses the socket-UART as a control and switch channel. That is, two channels are utilized to achieve a high-speed data transmission. Meanwhile, the traffic monitor unit monitors the data communication traffic at the USB interface. When the traffic is lower than a second preset threshold, the traffic monitor unit transmits a signal to the interface control unit. Then, the AP and the CP switches the data communication channel to the UART interface. The interface control unit controls the GPIO interface to provide a control signal to the switch device K1 to disconnect the latter.

When the mobile terminal is performing high-speed data communication, i.e., the data line D+/D− between the AP and the CP are connected, the OTG detection unit detects whether there is an external USB device inserted. If there is, the HNP (Host Negotiation Protocol) protocol will be initiated. If the result of the negotiation indicates that the AP serves as the USB master device, the bus configuration process is started to configure the externally inserted USB device as the slave device. In this case, the AP, serving as the USB master device, communicates with the external USB slave device and the CP slave device simultaneously. If the HNP protocol determines that the AP serves as the USB slave device, the AP switches the data communication channel to the UART interface and the OTG detection unit transmits a signal to the interface control unit. The interface control unit then controls the GPIO interface to output a control signal to control the switch device K1 to disconnect. In this case, the AP serving as the USB slave device communicates with the external USB master device while maintaining the data communication link with the CP through the UART interface.

Correspondingly, according to an embodiment of the present invention, a switching method for controlling a data transmission interface of a mobile terminal is provided, which comprises the following steps of:

A) detecting data traffic at the data transmission interface of an application processor;

B) comparing the data traffic with a preset threshold to obtain a comparison result; and C) controlling a high-speed data line between the application processor and a communication processor based on the comparison result; and transmitting a corresponding interface switching command to the communication processor for switching the data transmission interface of the communication processor.

The method further comprises: calculating periodically an average data traffic transmitted at the data transmission interface; and the step of comparing the data traffic with the preset threshold to obtain the comparison result particularly comprises:

determining whether the average data traffic is higher than a first preset threshold or a second preset threshold, and controlling the connection or disconnection of the high-speed data line between the application processor and the communication processor correspondingly if the average data traffic is higher than the first preset threshold or lower than the second preset threshold.

The method further comprises: switching the data transmission interface of the application processor if a corresponding message fed back from the communication processor indicating a successful interface switching is received after transmitting the corresponding interface switching command to the communication processor.

Figure 4:
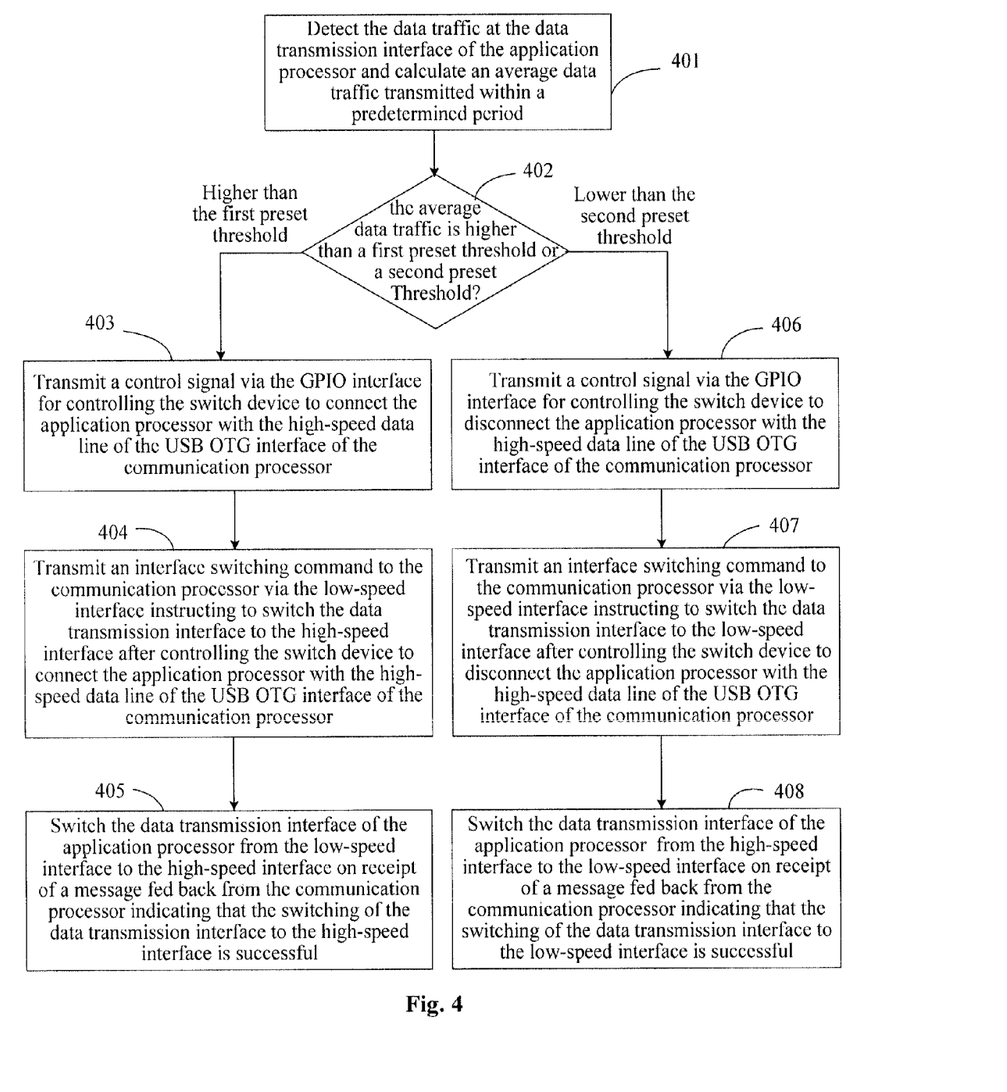
FIG. 4 is a flowchart showing the switching method for controlling a data transmission interface of a mobile terminal according to the fourth embodiment of the present invention.

The specific implementation process of this embodiment is detailed in FIG. 4, which is a flowchart showing the switching method for controlling a data transmission interface of a mobile terminal according to the fourth embodiment of the present invention. The method comprises the following steps.

At step 401, the data traffic at the data transmission interface of the application processor is detected and an average data traffic transmitted within a predetermined period is calculated.

At step 402, it is determined whether the average data traffic is higher than a first preset threshold or a second preset threshold, and the connection or disconnection of the high-speed data line between the application processor and the communication processor is controlled correspondingly if the average data traffic is higher than the first preset threshold or lower than the second preset threshold. That is, when the average data traffic is higher than the first preset threshold, the method proceeds with the following steps 403 to 405; when the average data traffic is lower than the second preset threshold, the method proceeds with the following steps 406 to 408.

At step 403, when it is determined that the average data traffic is higher than the first preset threshold, a control signal is transmitted via the GPIO interface for controlling the switch device to connect the high-speed data line between the USB OTG interfaces of the application processor and the communication processor.

At step 404, after controlling the switch device to connect the high-speed data line between the USB OTG interfaces of the application processor and the communication processor, an interface switching command is transmitted to the communication processor via the low-speed interface instructing to switch the data transmission interface to the high-speed interface.

At step 405, on receipt of a message fed back from the communication processor indicating that the switching of the data transmission interface to the high-speed interface is successful, the data transmission interface of the application processor is switched from the low-speed interface to the high-speed interface.

Otherwise, at step 406, when it is determined that the average data traffic is lower than the second preset threshold, a control signal is transmitted via the GPIO interface for controlling the switch device to disconnect the high-speed data line between the USB OTG interfaces of the application processor and the communication processor.

At step 407, after controlling the switch device to disconnect the high-speed data line between the USB OTG interfaces of the application processor and the communication processor, an interface switching command is transmitted to the communication processor via the low-speed interface instructing to switch the data transmission interface of the communication processor to the low-speed interface.

At step 408, on receipt of a message fed back from the communication processor indicating that the switching of the data transmission interface of the communication processor to the low-speed interface is successful, the data transmission interface of the application processor is switched from the high-speed interface to the low-speed interface.

The method further comprises controlling to disconnect the high-speed data line between the USB OTG interfaces of the application processor and the communication processor when the mobile terminal is powered on, and the step of detecting the data traffic at the data transmission interface is performed when a data service starts.

The method further comprises: switching, by the communication processor on receipt of the interface switching command transmitted from the application processor via the low-speed interface, the data transmission interface of the communication processor to the high-speed interface or the low-speed interface, and feeding back to the application processor a message indicating a successful interface switching.

The method further comprises: setting, when an external USB device is inserted into the application processor during high-speed data communication, the application processor as a master or slave device after negotiating with the external USB device; wherein if the application processor is set as the master device, the application processor communicates with the slave devices, i.e., the external USB device and the communication processor simultaneously; or if the application processor is set as the slave device, the application processor switches the data transmission interface to the low-speed interface, transmits an interface switching command to the communication processor instructing to switch the data transmission interface to the low-speed interface, disconnects the high-speed data line to the communication processor, communicates as a slave device with the external USB device and at the same time maintains data communication with the communication processor.

In this embodiment, as a non-limiting example, the low-speed interface includes a UART interface; the high-speed interface includes a USB interface or a high-speed USB interface; and the high-speed data line at the USB OTG interfaces includes a data line D+/D−.

In this embodiment, the application processor for high-speed data communication serves as a USB master device and the communication processor serves as a USB slave device. In this case, the communication is conducted according to fixed device configuration. That is, the bus configuration process for the USB interface is omitted and the application processor, which is the master device, communicates with the communication processor according to a fixed address and a fixed device identifier.

The implementations of the respective steps in the method of this embodiment correspond to those of the respective units in the above apparatus and, their description can thus be omitted.

Figure 5:
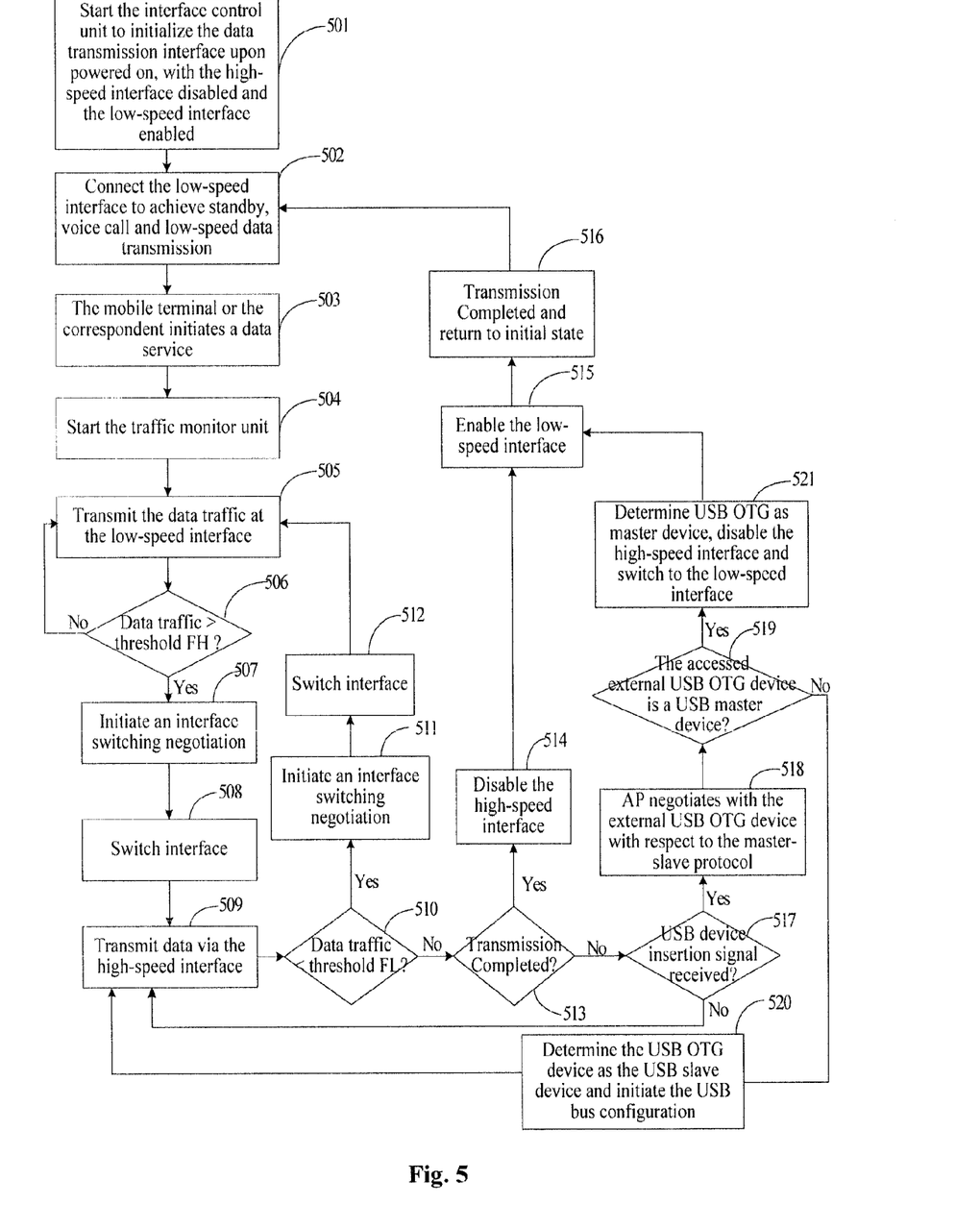
FIG. 5 is an application flowchart showing the switching method for controlling a data transmission interface of a mobile terminal according to the fifth embodiment of the present invention.

Reference is now made to FIG. 5, which is a specific flowchart showing the switching method for controlling a data transmission interface of a mobile terminal according to the fifth embodiment of the present invention. The method comprises the following steps.

At step 501, when the mobile terminal is powered on, the interface control unit is started to initialize the data transmission interface, with the high-speed interface disabled and the low-speed interface enabled to reduce the power consumption.

At step 502, the low-speed interface is connected to achieve standby, voice call and low-speed data transmissions. That is, the interface control unit of the application processor controls the switch device K1 via the GPIO interface to disconnect the data line D+/D−. In this case, the USB is in a disabled state (high-resistance state). The low-speed interface is always enabled for signaling interaction during the whole process.

At step 503, the mobile terminal or the correspondent initiates a data service.

At step 504, the traffic monitor unit is started when the data service starts.

At step 505, the data traffic transmitted at the low-speed interface is monitored periodically or at a fixed timing or in combination thereof.

At step 506, it is determined whether the data traffic is higher than or equal to a certain threshold FH. If not, the method returns to step 505.

At step 507, when the data traffic is equal to or higher than the certain threshold FH (e.g., the first preset threshold), an interface switching negotiation is initiated to notify the interface control unit of controlling the switch device K1 to connect the data line D+/D−. The interface control unit transmits an interface switching command to the interface switching unit of the CP via the low-speed interface (e.g., a UART interface).

At step 508, the interface is switched. That is, the interface switching unit of the CP starts switching of the data transmission interface on receipt of the interface switching command. After the interface is successfully switched, the CP transmits to the AP a confirm message. On receipt of this confirm message from the CP, the AP switches the data channel at the AP side to the high-speed interface (e.g., a USB interface).

At step 509, the AP transmits data via the high-speed interface. That is, the AP serves as the USB master device and the CP serves as the USB slave device. The CP conducts data transmission with the AP using fixed configuration parameters such as an address 0C and a device ID BB.

At step 510, the traffic monitor unit detects the data traffic at the high-speed interface (e.g., a USB interface) and determines whether the data traffic is lower than a certain threshold (e.g., the second preset threshold).

At step 511, when the data traffic is lower than the certain threshold (e.g., the second preset threshold), an interface switching negotiation is initiated. That is, the traffic monitor unit transmits a signal to the interface control unit. The AP and the CP switch the data transmission channel to the low-speed interface (e.g., a UART interface). The interface control unit controls the GPIO interface to provide a control signal to the switch device K1 for controlling the latter to disconnect the data line D+/D−. Then, the interface control unit transmits an interface switching command to the interface switching unit of the CP via the low-speed interface (e.g., a UART interface).

At step 512, the interface is switched. That is, the interface switching unit of the CP starts switching of the data transmission interface on receipt of the interface switching command. After the interface is successfully switched, the CP transmits to the AP a confirm message. On receipt of this confirm message from the CP, the AP switches the data channel at the AP side to the low-speed interface (e.g., a UART interface). Then, the method returns to step 505.

At step 513, it is determined whether the data transmission at the high-speed interface is completed. If so, the method proceeds with steps 514 to 516; otherwise, the method proceeds with step 517.

At step 514, the high-speed interface is disabled.

At step 515, the low-speed interface is enabled for data transmission.

At step 516, after the transmission is completed, the method returns to the initial state, i.e., returns to step 502.

At step 517, it is determined whether information indicating an external USB device as being inserted is received. That is, the OTG detection unit detects whether there is an external USB device inserted during high-speed data communication. If so, the method proceeds with step 518; otherwise, the method returns to step 509.

At step 518, the AP negotiates with the external USB OTG device with respect to the master-slave protocol.

At step 519, it is determined whether the inserted external USB OTG device is a USB master device. If so, the method proceeds with step 521; otherwise the method proceeds with step 520.

At step 520, if the negotiation between the AP and the inserted external USB OTG device determines that the AP serves as the USB master device, the AP initiates the USB bus configuration to set the external USB OTG device as the USB slave device. The AP being the USB master device communicates with the external USB OTG slave device and the CP slave device via the high-speed interface simultaneously. Then, the method returns to step 509.

At step 521, if the negotiation determines that the AP serves as the USB slave device. The AP switches the data transmission channel to the UART interface. The OTG detection unit transmits a signal to the interface control unit which then controls the GPIO interface to output a control signal for controlling the switch device K1 to disconnect the data line D+/D−. The AP communicates as the USB slave device with the external USB OTG master device while maintaining data communication link to the AP via the UART interface. After the high-speed data transmission is completed, the data channel is switched to the low-speed channel and the high-speed channel is disabled. That is, the high-speed interface is disabled and switched to the low-speed interface. Then, the method returns to step 515.

According to the embodiment of the present invention, the data traffic of data transmission is detected, the calculated average data traffic is compared with a preset threshold, and the connection or disconnection of the high-speed data line between the application processor and the communication processor is controlled based on the comparison. Meanwhile, an interface switching command for switching the data transmission interface to a high-speed interface or a low-speed interface is transmitted to the communication processor, and the data transmission interface of itself is switched to the high-speed interface or the low-speed interface on receipt of a response fed back from the communication processor indicating a successful interface switching. In other words, the high-speed data line is disconnected in a normal state where the application processor uses the low-speed interface to perform the transmission of signaling, data and switch commands with the communication processor, thereby reducing the system power consumption of the mobile terminal. When the mobile terminal requires a high-speed data service, a switch device is controlled to connect the high-speed data line (such as a data line D+/D−) between the application processor and the communication processor. That is, the application processor serves as a master device and the communication processor serves as a slave device. In this case, the communication is conducted according to fixed device configuration information, that is, the bus configuration process for the USB is omitted and the communication processor communicates with the application processor, which is the master device, according to a fixed address and a fixed device identifier. Therefore, according to the embodiments of the present invention, an adaptive switching of the data transmission interface can be achieved while obtaining the tradeoff between the rate and the power consumption of the data transmission interface for the application processor and the communication processor, such that the efficiency of data transmission can be improved.

Further, this embodiment further solves the problem of implementing, by the AP of the mobile terminal, both the function of data communication with the CP and the function of communication with an external inserted USB OTG device using a single USB OTG interface. That is, in the standby, voice call and low-speed data communication state, the USB connection between the AP and the CP is disconnected and the mobile terminal uses the USB interface as its USB OTG device, which the same as a common USB OTG. In the high-speed data communication state, the USB interface of the AP is connected to the CP in the mobile terminal and the AP serves as the master device in communication. At this time, if an external USB OTG device is inserted into this interface of the mobile terminal, the mobile terminal can detect the insertion of another device by using the VBUS and the ID pin of the USB OTG interface. The mobile terminal then initiates an OTG master-slave negotiation protocol. If it is determined by negotiation that the inserted USB OTG device is a master device, then the mobile terminal will become a slave device. At this time, the high speed USB data line between the AP and the CP is disconnected and the data service is switched to the socket-UART automatically, such that the mobile terminal can become the USB slave device. If the inserted USB OTG device is determined by negotiation as a slave device, the mobile terminal will conduct communication as a master device with its two slave devices (i.e., the CP and the inserted USB OTG device) according to the USB protocol. Therefore, with the embodiments of the present invention, an adaptive switching between the high-speed interface and the low-speed interface can be achieved based on the amount of the data transmission while obtaining the tradeoff between the rate and the power consumption of the data transmission interface for the application processor and the communication processor, such that the efficiency of data transmission can be improved.

It can be appreciated by those skilled in the art from the description of the above embodiments that the present invention can be implemented by software in combination of necessary general hardware platform or by hardware, but the former is preferred in many cases. Based on this understanding, the solution of the present invention or the part making contribution to the prior art can be substantially embodied in software product. This computer software product can be stored in a storage medium, such as ROM/RAM, magnetic disk, optical disk and the like, and comprises several instructions for causing a computer device (which can be a personal computer, a server or a network device) to perform the method described in the respective embodiments, or some parts thereof, according to the present invention.

While the foregoing has described the preferred embodiments of the present invention, it should be noted that those who skilled in the art can make various improvements and modifications without departing from the principle of the present invention. These improvements and modifications are encompassed by the scope of the present invention.

What is claimed is:

1. A mobile terminal, comprising an application processor, a communication processor and data transmission interfaces thereof, wherein the application processor comprises:
   a traffic monitor unit configured to detect data traffic of data transmission, compare the data traffic with a preset threshold to obtain a comparison result, and output the comparison result; and
   an interface control unit configured to control, on receipt of the comparison result, the connection or disconnection of a high-speed data line between the application processor and the communication processor, and to transmit a corresponding interface switching command to the communication processor for switching the data transmission interface of the communication processor,
   wherein the communication processor further comprises:
   an interface control unit configured to switch the communication processor of the communication processor from the low-speed interface to the high-speed interface, or vice versa, in response to the receipt of the interface switching command transmitted from the interface control unit of the application processor, and to feed back a confirm message to the interface control unit of the application processor indicating a successful interface switching, and
   wherein the interface control unit of the communication processor comprises:
   an initial setting unit configured to set a low-speed channel for signaling interaction and data transmission when the mobile terminal is powered on;
   a switching command receiving unit configured to receive via the low-speed interface an interface switching command transmitted from the application processor;
   an interface switching unit configured to switch, on receipt of the interface switching command from the switching command receiving unit, the data transmission interface of the communication processor from the low-speed interface to the high-speed interface, or vice versa; and
   a switching command transmission unit configured to transmit via the low-speed interface a command to the application processor indicating the successful interface switching after the interface switching unit completes the interface switching.

2. A mobile terminal, comprising an application processor, a communication processor and data transmission interfaces thereof, wherein the application processor comprises:
   a traffic monitor unit configured to detect data traffic of data transmission, compare the data traffic with a preset threshold to obtain a comparison result, and output the comparison result; and
   an interface control unit configured to control, on receipt of the comparison result, the connection or disconnection of a high-speed data line between the application processor and the communication processor, and to transmit a corresponding interface switching command to the communication processor for switching the data transmission interface of the communication processor, wherein the application processor further comprises:

an OTG detection unit configured to detect whether there is an external USB OTG device inserted into the interface of the application processor; set, upon such detection, the application processor as a master or slave device after negotiating with the USB device; and notify the interface control unit to switch the corresponding data transmission interface if the application processor is set as the slave device.

3. The mobile terminal according to claim 2, wherein the OTG detection unit comprises:

a detection unit configured to detect whether there is an external USB OTG device being inserted during high-speed data communication, and transmit a detection result for the insertion of the USB OTG device;

a negotiation unit configured to negotiate, on receipt of the detection result indicating the insertion of a USB OTG device, with the external USB OTG device and transmit a negotiation result; and a setting unit configured to set the application processor as the master or slave device based on the received negotiation result, wherein if the application processor is set as the master device, it communicates with the external USB OTG device and the communication processor both serving as the slave devices simultaneously; if the application processor is set as the slave device, it switches the data transmission interface to the low-speed interface, transmits an interface switching command to the interface control unit instructing it to disconnect the high-speed data line between the application processor and the communication processor, communicates as the slave device with the external USB OTG device and maintain its data communication with the communication.

4. A switching method for controlling a data transmission interface of a mobile terminal, comprising the following steps of:

detecting data traffic at the data transmission interface of an application processor;

comparing the data traffic with a preset threshold to obtain a comparison result;

controlling a high-speed data line between the application processor and a communication processor based on the comparison result; and transmitting a corresponding interface switching command to the communication processor for switching the data transmission interface of the communication processor, wherein the method further comprises switching, by the communication processor on receipt of the interface switching command transmitted from the application processor, the data transmission interface of the communication processor to the high-speed interface or the low-speed interface, and feeding back to the application processor a message indicating a successful interface switching, and wherein the step of switching the data transmission interface of the communication processor to the high-speed interface or the low-speed interface and feeding back to the application processor a message indicating a successful interface switching comprises:

setting a low-speed channel for signaling interaction and data transmission when the mobile terminal is powered on;

receiving via the low-speed interface an interface switching command transmitted from the application processor;

switching, on receipt of the interface switching command from the switching command receiving unit, the data transmission interface of the communication processor from the low-speed interface to the high-speed interface, or vice versa; and transmitting via the low-speed interface a command to the application processor indicating the successful interface switching after the interface switching unit completes the interface switching.

* * * * *